Oct. 23, 1962    R. A. STANLEY ET AL    3,060,261

SHIELDED ELECTRIC CABLE

Filed March 30, 1960

INVENTORS
ROBERT A. STANLEY
ALLEN C. BLUESTEIN
BY

THEIR AGENT

United States Patent Office
3,060,261
Patented Oct. 23, 1962

3,060,261
SHIELDED ELECTRIC CABLE
Robert A. Stanley and Allen C. Bluestein, Marion, Ind., assignors to Anaconda Wire & Cable Company, a corporation of Delaware
Filed Mar. 30, 1960, Ser. No. 18,732
6 Claims. (Cl. 174—120)

This invention relates to shielded electric cables and more particularly to cables in which the shielding can be stripped cleanly from the insulation; and to processes for making such cables.

When terminations or joints are made in high-voltage cables, a large proportion of the time required for making the termination or joint is employed in stripping the semiconducting shielding material from the insulation in a manner such that no semiconducting particles remain imbedded in the surface of the insulation.

In the manufacture of electric cable, it is highly desirable, from the standpoint of long cable service life, to maintain a firm bond between the outer surface of the cable insulation and the adjacent layer of semiconducting shielding tape. While a firm bond between the insulation and the semiconducting tape is, as has been stated, an asset from the point of view of cable performance, it presents the problem that any conducting residues left on the insulation due to incomplete removal of the semiconducting tape at terminations will be potential causes of cable failure.

It is an object of this invention to provide a high-voltage cable with semiconducting shielding that bonds firmly to the insulation but leaves no traces of semiconducting material when it is stripped off.

This object is achieved by employing as the semiconducting shielding of high-voltage cable a wrapping of supported tape, coated with semiconducting compound having a tensile strength exceeding the tensile strength of the compound comprising the insulation.

Figure 1:
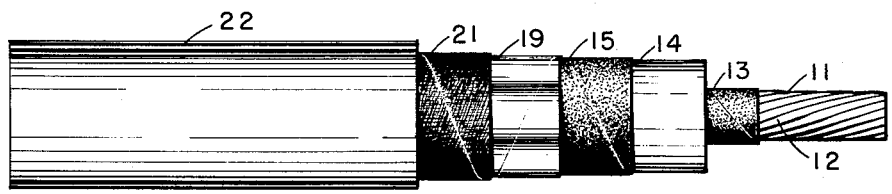
Figure 2:
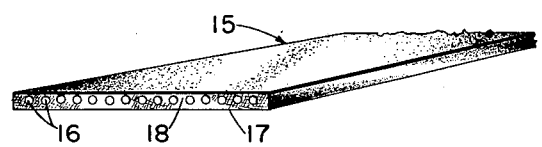

In the drawing:
FIG. 1 is a lengthwise view of cable made to the teaching of this invention.
FIG. 2 is a perspective view of semiconducting tape made to the teaching of this invention.

In the cable of FIG. 1, the electrical conductor 11 is composed of a plurality of copper wires 12. A semiconducting strand shielding tape 13 is wrapped over the conductor 11 and an annular layer of insulation 14 is applied over the tape 13. The insulation 14 is preferably an extrusion of butyl rubber but may be natural rubber, or other synthetic rubber-like polymers, any of which shall be understood to be included in the term "rubber," or vulcanizable polyethylene, or other material suitable for insulating high-voltage cable and may be applied by methods other than extrusion such as by taping followed by vulcanization or fusion to form a solid insulating wall.

A semiconducting shielding and bedding tape 15 is wrapped over the insulation 14. The tape 15 consists of a supporting fabric 16 (FIG. 2) imbedded in a semiconducting compound coating 17. Although fabric is the preferred form of the tape-supporting material, other structural supports having high tensile strength may be used without affecting the novelty of this disclosure.

It is preferred that the coating 17 should be applied to both sides of the supporting fabric 16 and that the coating 17 should penetrate the spaces 18 between the fibers of the fabric.

A metal tape 19 is wrapped over the semiconducting tape 15. The tape 19 in combination with the tape 15 form an electrical shield for the cable. The tape 19 is preferably tin-coated copper but may alternatively be bare copper or aluminum. The cable tape 21 binds down the shielding tapes 15 and 19 during subsequent manufacturing operations and serves as support to the jacket 22. Tape 21 is preferably neoprene, supported by glass fibers.

A jacket 22 comprises the outer covering of the cable. The jacket 22 consists preferably of vulcanized neoprene bonded to the cable tape 21. Jackets of butyl rubber or other suitable material such as polyethylene may also be employed within the scope of this invention.

The coating 17 is compounded to have high tensile strength after vulcanization. The coating 17 will have a tensile strength after vulcanization exceeding the tensile strength of the insulation 14.

In the manufacture of high-voltage cables which may usually be construed to mean cables intended for service above 2000 volts, it is customary to apply a shielding layer of conducting or semiconducting material directly over the insulation. In the most usual cable construction there will be a semiconducting layer adjacent to the insulation and a conducting layer, such as a wrapping of metallic tape, directly over the semiconducting layer.

It is of the utmost importance that the semiconducting layer should be in intimate contact with the surface of the insulation, particularly in the case of dry-insulated cables, for, if there are any spaces between the surface of the insulation and the semiconducting layer the air in such spaces will ionize under the influence of a high electric stress. Ionized air spaces are focal points for ultimate cable failure either for the reason that ozone is formed in the air space or by reason of other mechanisms that are known to the science of dielectric breakdown.

In order to achieve an intimate contact between the surface of a cable insulation and a semiconducting shielding tape, the latter may be composed of a resilient material such as rubber which will conform to irregularities in the insulation surface. It is not, however, sufficient to have an intimate contact between the surface of the insulation and the semiconducting tape only at the time of manufacture. Such contact must be maintained during the service life of the cable, during reeling and unreeling, during installation, and during the cyclic flexing that occurs in cables after installation when they are periodically heated by service loads with alternate periodic cooling. Rubber insulated cables, being inherently more flexible than other types, present more of a problem for maintaining contact between the surface of the insulation and the semiconducting tape.

The best way of assuring permanent freedom from air spaces between the surface of a cable insulation and a semiconducting layer over such insulation is to bond the semiconducting layer to the insulation. Such a bond may be achieved by an adhesive coating applied to the surface of the insulation directly prior to application of the tape, but it is more satisfactorily achieved by vulcanizing the tape to the insulation while they are in contact. The disadvantage of the use of an adhesive to bond semiconducting tape to cable insulation resides in the fact that it requires an extra operation in the manufacture of a cable. Moreover, the application of adhesive to the surface of a cable insulation is a wet operation during which it is difficult to maintain the standards of extreme cleanliness characteristic of a modern high-voltage cable manufacturing plant.

Semiconducting rubber tapes may be strips cut from sheets of rubber and free from any fabric backing or other structurally supporting material, or they may consist of fabric or other supporting tapes coated with a rubber compound. When rubber strips, free from supporting material, are used for the semiconducting shielding of electric cables, the rubber strips must be vulcanized before application to make them strong enough to be applied by high-speed taping machines. In compounding such unsupported rubber tapes some consideration would also be given to the strength of the tape after vulcanization so that it would not break during application.

There are, however, serious shortcomings to the use of unsupported vulcanized rubber for semiconducting cable-shielding tape. The first of these shortcomings is that fully vulcanized tape will not bond firmly to the insulation without the addition of an adhesive and such adhesive has been shown to be objectionable for the reasons that have been stated above. The second is that even when such a tape is compounded to be strong enough to withstand the rigors of application by high speed machines, the stretchability of rubber makes it impossible to handle unsupported rubber tapes on conventional taping equipment and specially designed machines are necessary.

Either of the above listed shortcomings would be sufficient to proscribe the use of unsupported tapes, with the result that structurally supported tapes have become standard for the semiconducting shielding of rubber-insulated cables. In a supported tape, all the tensile strength necessary for handling the tape in high speed machines is supplied by the supporting fabric with the result that it is no longer necessary to vulcanize the semiconducting compound prior to its application to the cable. Neither has it been considered necessary to employ a high tensile strength compound for coating the fabric of semiconducting cable-shielding tape since in the prior-art view a high-tensile-strength compound would serve no purpose so long as the strength requirements of the tape were met by a fabric backing.

We have discovered that a superior cable will result from the use of fabric supported semiconducting tape impregnated with a compound which will have a high tensile strength subsequent to vulcanization, despite the fact that the tensile-strength requirement for applying the tape is adequately met by the strength of the fabric alone.

The art of rubber compounding has progressed to the point that a skilled compounder can select a known recipe to achieve any of a wide range of rubber properties and no claim is made herein to the discovery of a new rubber-compound recipe. It is known that a high tensile strength can be attained in a rubber compound by incorporating certain reinforcing fillers such as carbon black. Another known reinforcing filler is precipitated silica.

In addition to the carbon blacks such as FEF (fast extrusion furnace) black, valuable for their reinforcing properties there are carbon blacks that are outstanding for imparting semiconductivity to compounds which would otherwise have a very high electrical resistivity. Such a carbon black is acetylene black. Acetylene black is the carbon black most frequently used in the prior art where it has been desired to make a semiconducting compound stock. The addition of acetylene black to a rubber compound in quantities sufficient to make the compound semiconducting will not make a significant improvement in its tensile strength.

The high-tensile-strength semiconducting compound used in the fabric-supported tape of this invention is chosen to have a sufficient percentage of reinforcing filler to achieve the degree of tensile strength hereinafter specified. It has been determined that when the reinforcing filler consists of FEF black no further filler is required to render the compound semiconducting. When other reinforcing fillers are chosen, the desired degree of semiconductivity can be achieved by the addition of small quantities of acetylene black in a manner known to the art.

In an example a tape having a 58 x 48 thread cotton base fabric weighing 4.3 yds./lb. of 40-inch width was friction coated on one side and skim coated on the other side to a total thickness of 15 mils, with a semiconducting butyl compound having the following composition:

| | Percent by weight |
|---|---|
| Butyl rubber | 47 |
| Carbon black-FEF | 26 |
| Whiting | 15 |
| Processing aids | 6 |
| Vulcanizing agents | 6 |

The resistivity of this compound was 50,000 ohm-cm. and the tensile strength, after vulcanization, was 1,520 p.s.i.

The tape of the example was applied over vulcanized insulation having the following composition:

| | Percent by weight |
|---|---|
| Butyl rubber | 40 |
| Filler | 45 |
| Processing aids | 7 |
| Carbon black | 2 |
| Vulcanizing agents | 6 |

Tensile strength of the insulation after vulcanization was 1,000 p.s.i. Tape manufactured according to the example was applied after a conductor had been insulated with the above compound and had been vulcanized. The metal tape 19, cable tape 21 and neoprene jacket 22 were then applied and the semiconducting tape was vulcanized during the operation of vulcanizing the jacket.

In the example, the tensile strength of the insulation was 1,000 p.s.i. and the tensile strength of the tape compound was 1,520 p.s.i. If the content of carbon black in the insulation does not exceed 5% and the carbon black content of the tape compound does not drop below 15%, the difference in tensile strength in the two compounds will be sufficient to assure free-stripping of the tape.

The semiconducting tape was bonded to the insulation and when it was stripped no conducting particles remained on the insulation surface.

In the example the semiconducting tape 15 was applied after the insulation 14 had been fully vulcanized. Alternatively the tape 15 may be applied to the insulation 14 before the latter has been vulcanized or when it has received only a partial vulcanization. Final vulcanization of the insulation 14 will then occur simultaneously with the vulcanization of the tape 15 and jacket 22.

We claim:

1. An electric cable comprising a conductor, an annular wall of homogeneous insulation surrounding said conductor, a structurally-supported, vulcanized, semiconducting-compound tape vulcanized to the outer surface of said insulation, and completely covering said surface, said semiconducting compound being formulated so as to have a tensile strength substantially greater than the tensile strength of said insulation whereby said semiconducting-compound tape is strippable completely from said insulation.

2. An electric cable comprising a conductor, an annular wall of rubber insulation surrounding said conductor, a fabric-supported, vulcanized, semiconducting-rubber tape vulcanized to the outer surface of said insulation and completely covering said surface, said semi-conducting rubber having a tensile strength substantially greater than the tensile strength of said rubber insulation whereby said semiconducting-rubber tape is strippable completely from said insulation.

3. An electric cable comprising a conductor, an annular wall of butyl-rubber insulation surrounding said conductor, a structurally-supported, vulcanized, semiconducting-butyl-rubber tape vulcanized to the outer surface of said insulation and completely covering said surface, said semiconducting rubber having a tensile strength substantially greater than the tensile strength of said butyl-rubber insulation, whereby said semiconducting-rubber tape is strippable completely from said insulation.

4. An electric cable comprising a conductor, an annular wall of butyl-rubber insulation surrounding said conductor, said butyl-rubber insulation comprising no more than 5% of reinforcing carbon black, a fabric-supported vulcanized, semiconducting butyl-rubber tape vulcanized to the outer surface of said insulation and completely covering said surface, said semiconducting rubber comprising no less than 15% of a reinforcing carbon black and having a tensile strength substantially greater than the tensile strength of said butyl-rubber insulation, whereby said semiconducting-rubber tape is strippable completely from said insulation.

5. An electric cable comprising a conductor, an annular wall of butyl-rubber insulation surrounding said conductor, said butyl-rubber insulation comprising approximately

| | Percent by weight |
|---|---|
| Butyl rubber | 40 |
| Filler | 45 |
| Carbon black | 2 |
| Processing aids | 7 |
| Vulcanizing agents | 6 | fabric-supported, vulcanized semiconducting-butyl-rubber tape vulcanized to the outer surface of said insulation and completely covering said surface, said semiconducting rubber comprising approximately

| | Percent by weight |
|---|---|
| Butyl rubber | 47 |
| Carbon black-FEF | 26 |
| Whiting | 15 |
| Processing aids | 6 |
| Vulcanizing agents | 6 |

6. The process of manufacturing and installing shielded electric cable comprising the steps of insulating a metallic conductor with an annular wall of butyl-rubber insulation, subjecting said insulated conductor to heat and pressure to partially vulcanize said insulation, wrapping said insulated conductor with a structurally-supported, unvulcanized, semiconducting butyl-rubber tape to completely cover said insulation, subsequently subjecting said tape-wrapped cable to heat and pressure to vulcanize said semiconducting rubber, complete the vulcanization of said insulation and bond said semiconducting rubber to the surface of said insulation, the tensile strength of said semiconducting rubber after vulcanization being substantially greater than the tensile strength of said butyl-rubber insulation, and subsequently unwinding said tape from said cable while leaving the surface of said insulation free from conducting particles.

References Cited in the file of this patent

UNITED STATES PATENTS

| 2,074,826 | Boggs | Mar. 23, 1937 |
| 2,096,840 | Bormann | Oct. 26, 1937 |
| 2,320,313 | Thomas et al. | May 25, 1943 |